(12) United States Patent
Presniakov et al.

(10) Patent No.: US 8,149,377 B2
(45) Date of Patent: Apr. 3, 2012

(54) TUNABLE-FOCUSING LIQUID CRYSTAL LENS CELL AND METHOD OF FABRICATION THEREOF

(75) Inventors: Vladimir Presniakov, Québec (CA); Tigran Galstian, Québec (CA); Karen Asatryan, Québec (CA); Amir Tork, Quebec (CA); Aram Bagramyan, Québec (CA); Armen Zohrabyan, Quebec (CA)

(73) Assignee: LensVector Inc., Mountain View, CA (US)

( * ) Notice: Subject to any disclaimer, the term of this patent is extended or adjusted under 35 U.S.C. 154(b) by 474 days.

(21) Appl. No.: 12/487,811

(22) Filed: Jun. 19, 2009

(65) Prior Publication Data

US 2009/0316097 A1    Dec. 24, 2009

Related U.S. Application Data

(60) Provisional application No. 61/074,652, filed on Jun. 22, 2008.

(51) Int. Cl.
  *G02F 1/13* (2006.01)
  *G02F 1/1337* (2006.01)
(52) U.S. Cl. ......... 349/200; 349/129; 349/123; 349/187
(58) Field of Classification Search .................. 349/200, 349/129, 123, 187
  See application file for complete search history.

(56) References Cited

U.S. PATENT DOCUMENTS

| | | | |
|---|---|---|---|
| 6,864,951 B1 * | 3/2005 | Ren et al. | 349/200 |
| 8,028,473 B2 * | 10/2011 | Galstian et al. | 49/57 |
| 2011/0090415 A1 * | 4/2011 | Asatryan et al. | 349/33 |
| 2011/0109824 A1 * | 5/2011 | Galstian | 349/33 |

OTHER PUBLICATIONS

S. Sato, "Applications of Liquid Crystals to Variable-Focusing Lenses," Optical Review, vol. 6, No. 6 (1999) 471-485.
S. Sato, "Liquid-Crystal Lens-Cells with Variable Focal Length," Japanese Journal of Applied Physics, V.18, No. 9, pp. 1679-1684, 1979.

* cited by examiner

*Primary Examiner* — Mike Qi
(74) *Attorney, Agent, or Firm* — Anglehart et al.

(57) ABSTRACT

A tunable-focusing liquid crystal lens (TLCL) cell has a liquid crystal layer arranged within a cell gap defined between substrates, a layer of optically transparent material arranged between the first substrate and the LC layer, and a liquid crystal alignment layer arranged between the optically transparent layer and the LC layer. The alignment layer is provided on a third optically transparent substrate having a non-planar shape for giving a non-planar profile to the LC layer, which substrate is obtained from a flexible sheet initially provided with the alignment layer and then formed into the non-planar shape. The lens further has a first optically transparent electrode provided on the second substrate, a second optically transparent electrode provided on either or both of first and third substrates. The electrodes are arranged to generate an electric field acting on the LC layer to change the focal distance of the LC cell. Methods for fabricating such TLCL cell are also provided.

32 Claims, 13 Drawing Sheets

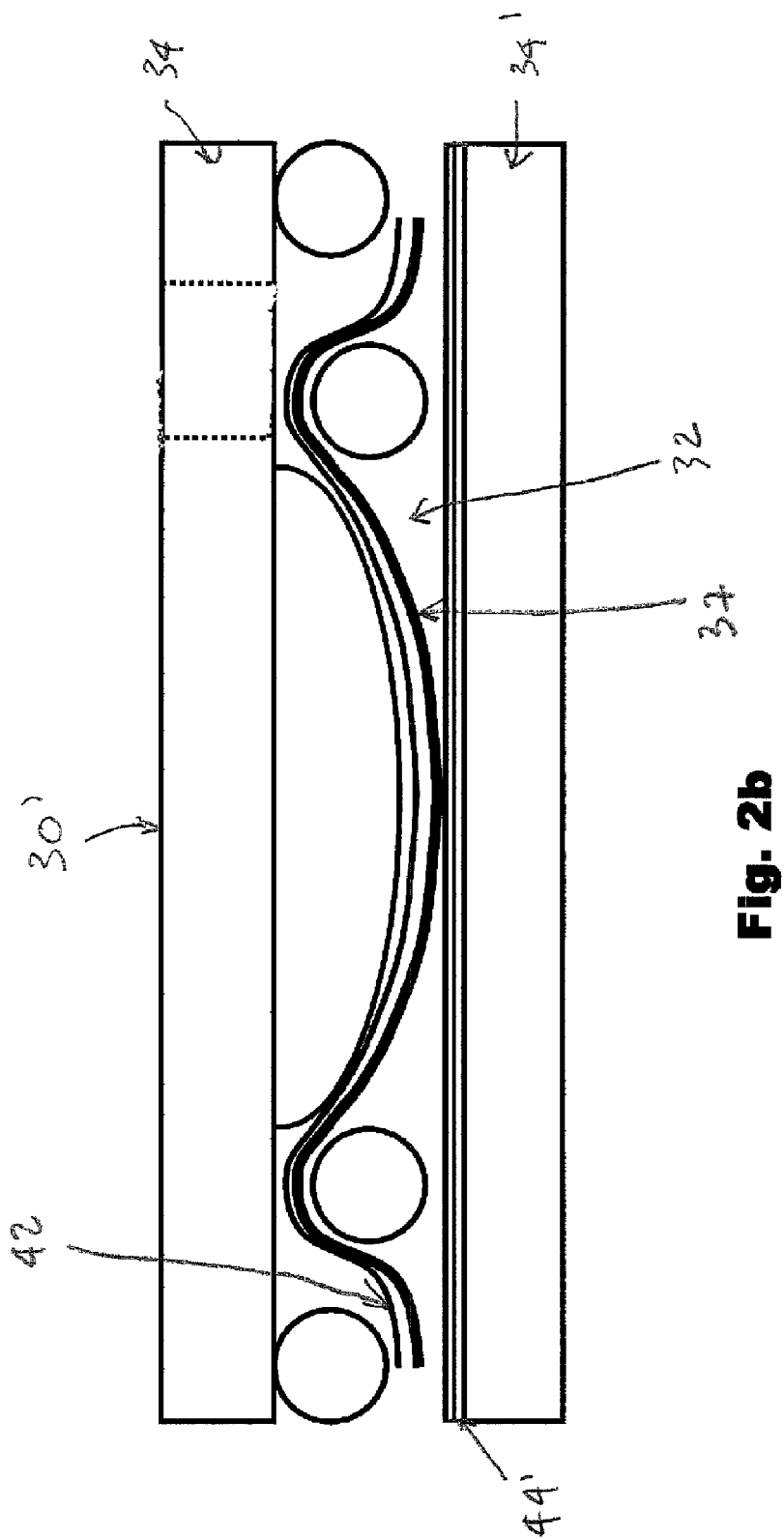

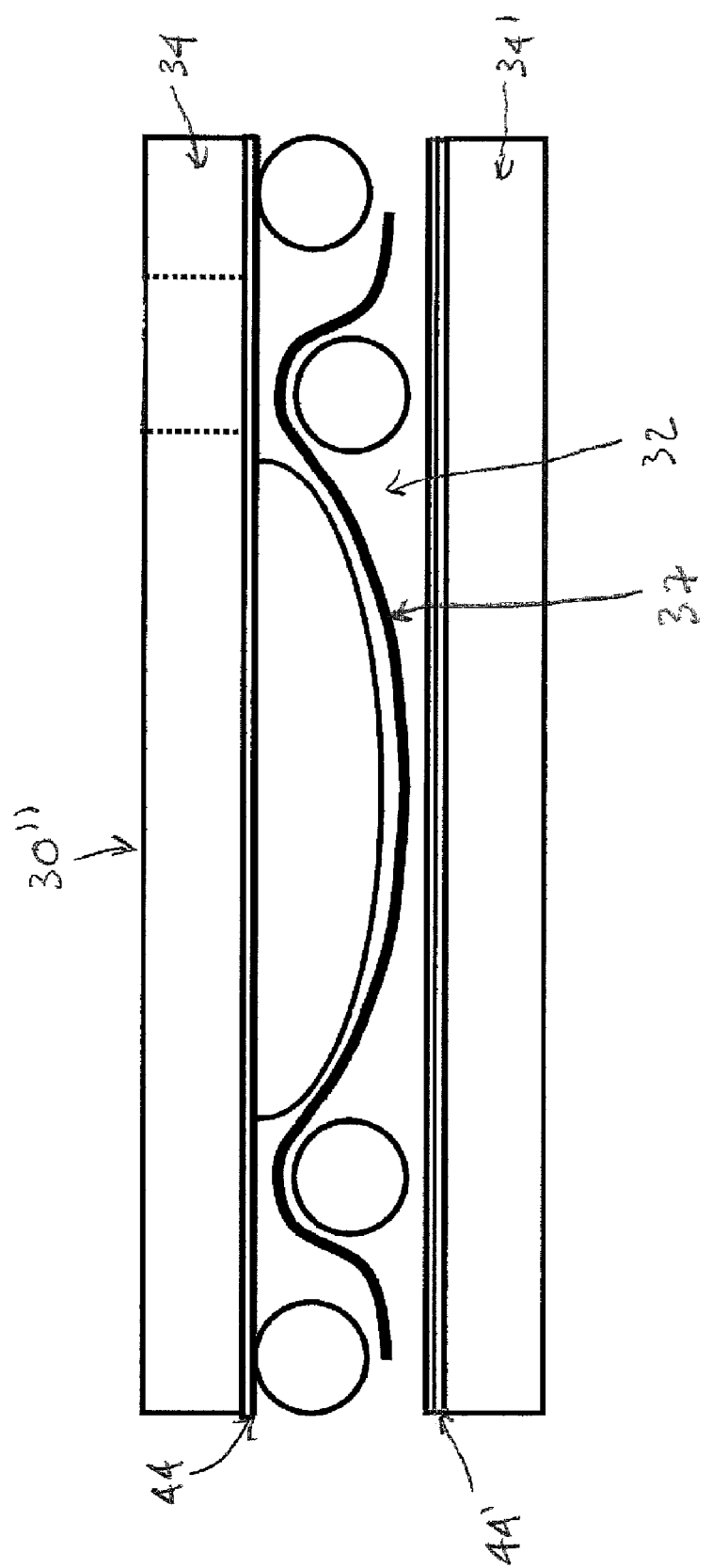

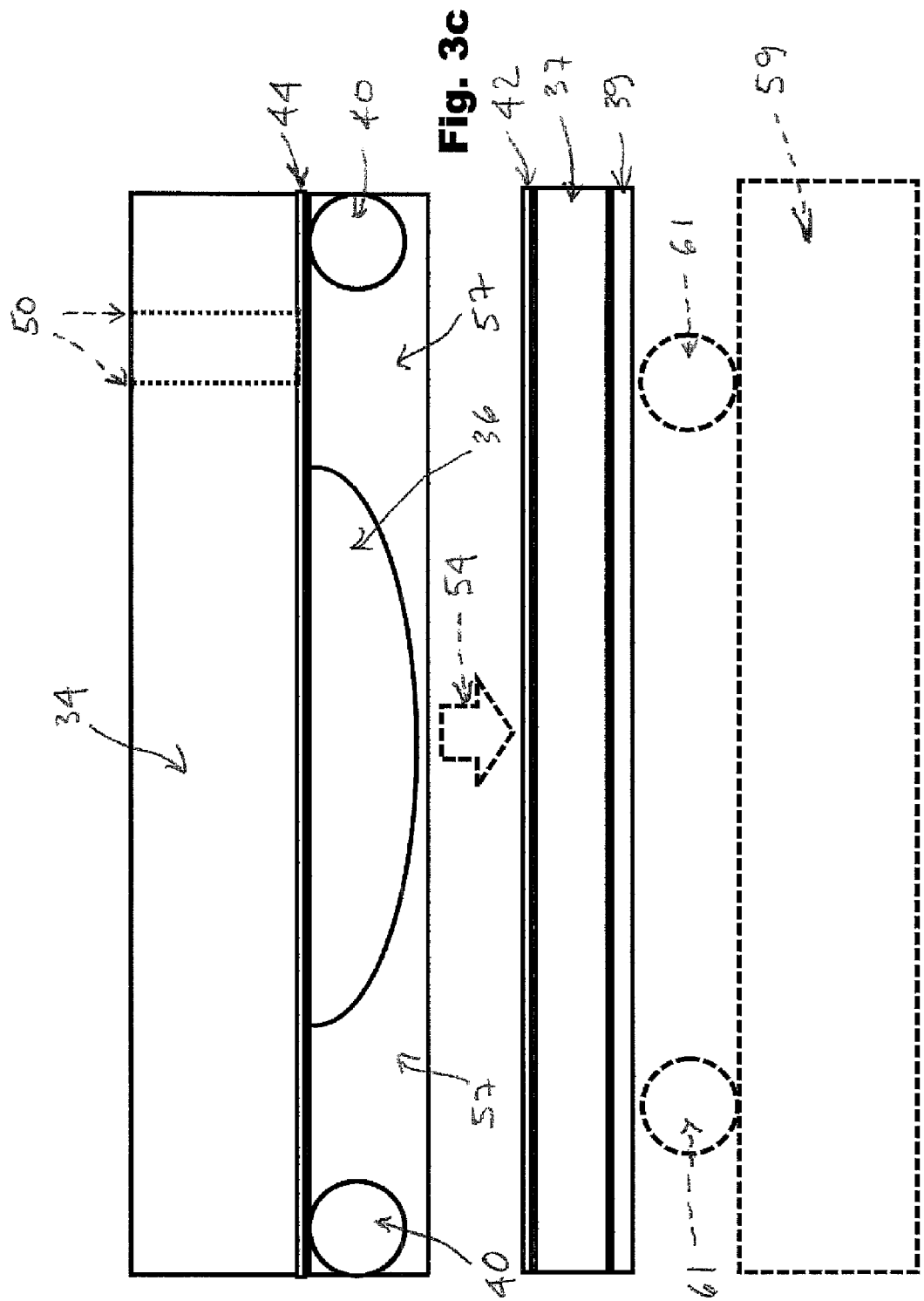

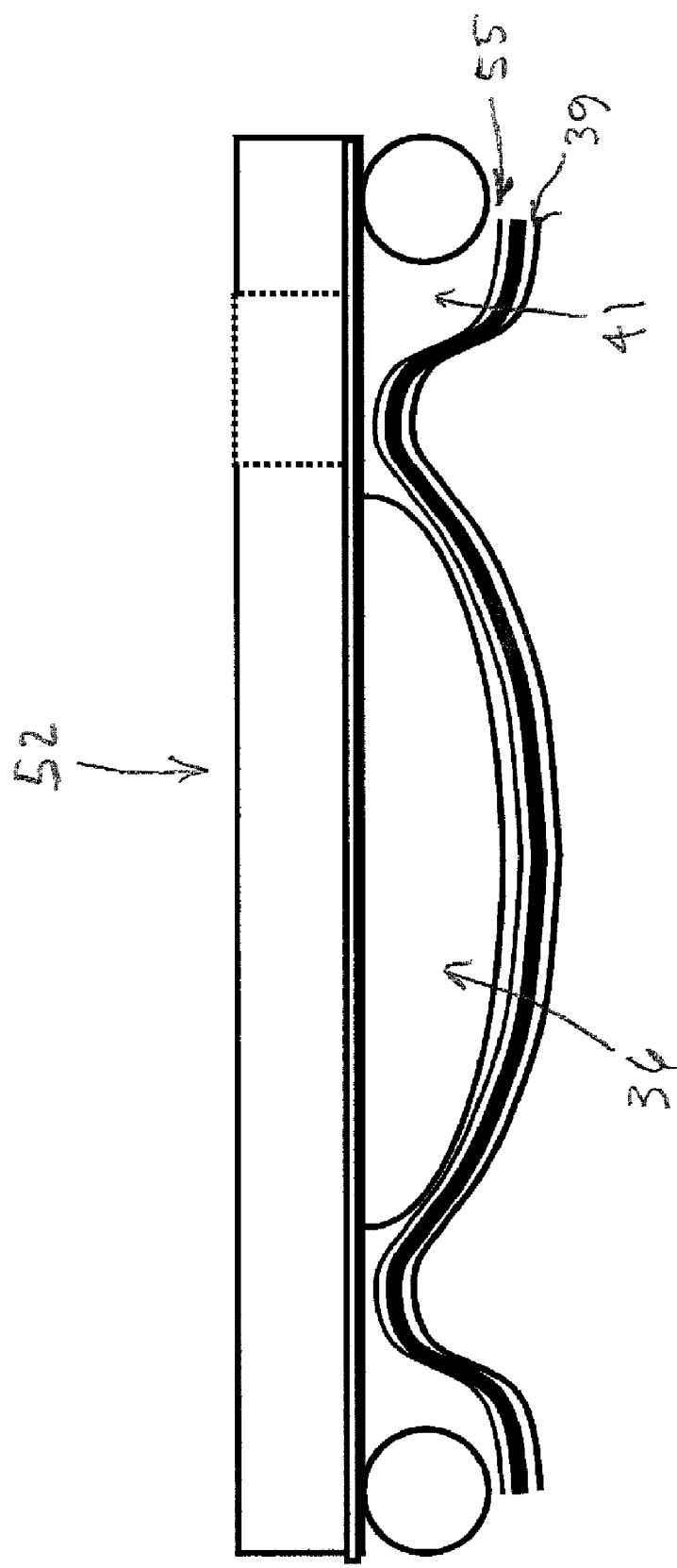

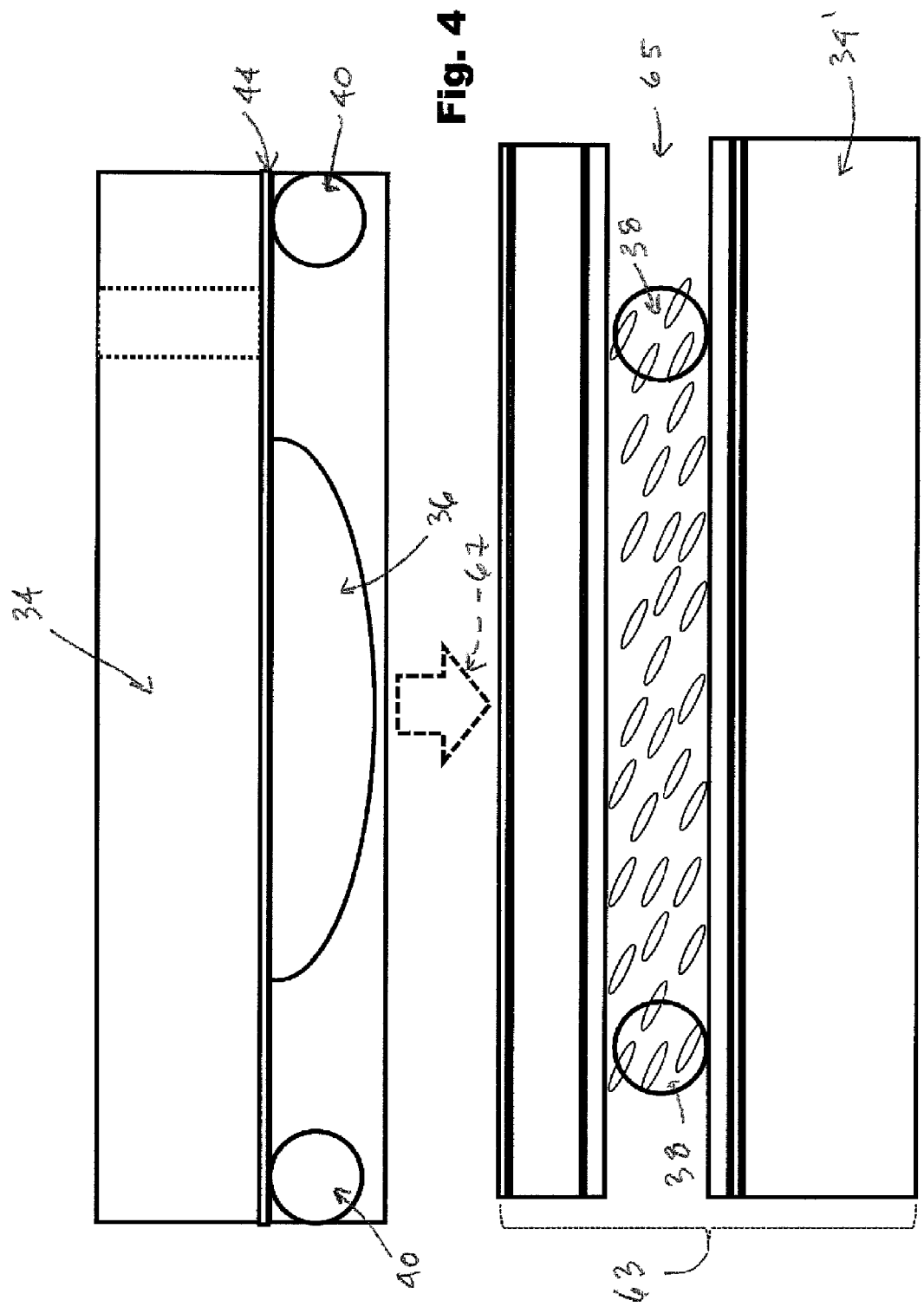

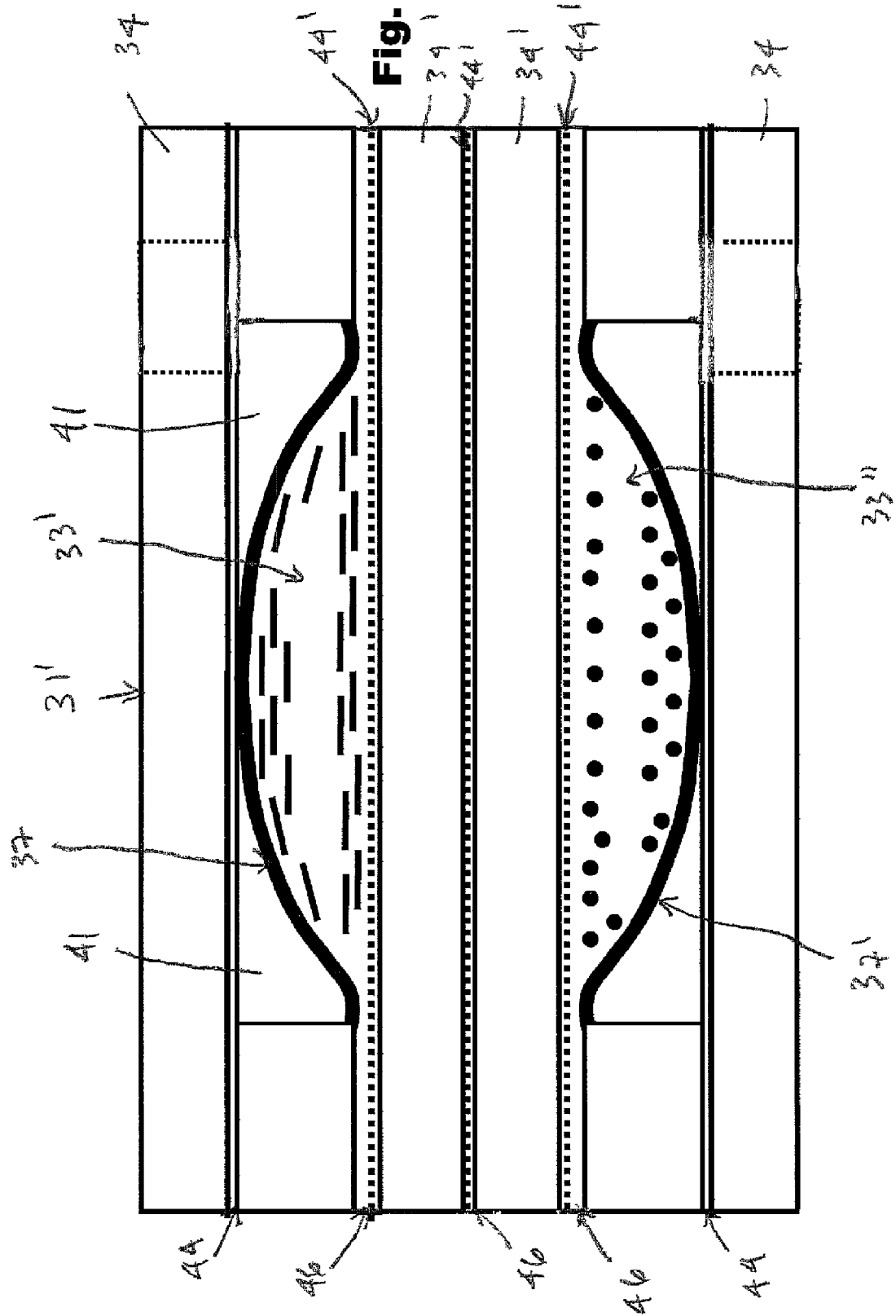

TUNABLE-FOCUSING LIQUID CRYSTAL LENS CELL AND METHOD OF FABRICATION THEREOF

TECHNICAL FIELD

The present invention relates to adaptive optical devices and, in particular, to tunable focusing lens cells using non-planar liquid crystal cell gap and methods of fabrication thereof.

BACKGROUND OF THE INVENTION

The use of liquid crystals (LC) for the creation of electrically tunable-focusing LC lenses (TLCLs), has been explored since few decades [S. Sato, "Applications of Liquid Crystals to Variable-Focusing Lenses," Optical Review, Vol. 6, No. 6 (1999) 471-485]. One of the earliest geometries proposed was the TLCL based on the non-planar LC cell gap [S. Sato, "Liquid-Crystal Lens-Cells with Variable Focal Length," Japanese Journal of Applied Physics, V. 18, No. 9, pp. 1679-1684, 1979], such as the one shown in FIG. 1a (PRIOR ART). The TLCL cell (10) uses a non-planar liquid crystal cell gap (12) sandwiched between two transparent glass substrates (14) covered by planar transparent electrodes (15), and transversely confined between rigid spacers (16). The cell gap separating the substrates is of a thickness d and includes a non-planar layer (13) filled with LC (17). In the example shown, inside the LC cell gap there is an element (18) made of transparent optical material such as an optical adhesive and characterized by a plano-concave profile and a refractive index $n_m$ which matches the ordinary index of refraction $n_o$ of the LC (defined by the orientation of its director n that is the average direction of long molecular axes). The value of effective refractive index $n_{eff}$ may be changed with respect to $n_o = n_m$ by applying an electric voltage V across the LC cell gap, up to an extra-ordinary value $n_e$. The relative contrast of refractive index $n_{eff}(V) - n_m$ may thus be changed resulting in a change of focal distance F(V) of the whole system. Assuming the following typical parameter values: h=15 µm; r=0.8 mm→θ≈h/r=15/800 rad≈1.07 deg. Thus, in that typical example, the optical power may be estimated as follows: $OP = 2(n_e - n_o) \times h/r^2 = 2 \times 0.2 \times 15 \times 10^{-6}$ m÷$0.64 \div 10^{-6}$ m$^2$. It can be appreciated that with such optical parameter values, that type of TLCL could be very useful for small aperture applications such as mobile phone or web cam autofocus.

Heretofore, the industrial fabrication of a LC cell layer with curved internal surfaces, which requires precise LC alignment and orientation amongst other technical requirements, has proved to be a very difficult task when employing the typical manufacturing method that uses mechanical rubbing, which will be now described in view of FIG. 1b (PRIOR ART). A flat glass substrate (14), of typically 0.5 to 0.75 mm thickness, is first coated by an optically transparent and electrically conductive material, such as, e.g., Indium Tin Oxide (ITO), to form a transparent electrode (15). Then the ITO electrode is coated by a thin layer of alignment material (20), such as SiO$_x$ or Polyimide. In the case of the SiO$_x$, the deposition conditions (angle, gas atmosphere, temperature, etc.) are chosen in a way to obtain the desired alignment and pre-tilt angle. In the case of the polymer material, the alignment and pre-tilt directions are imposed by the rubbing in a predetermined direction (22) of the layer by a rotating cylinder-type device (24). The position of the rubbing device relative to the substrate is controlled to maintain the working surface of the device in close contact with the exposed surface of the alignment layer to ensure accurate alignment of the LC molecules with high anchoring energy and the predetermined pre-tilt angle when assembling two such substrates (14) as shown in FIG. 1c (PRIOR ART). A LC cell sandwich is assembled with appropriate deposited or rubbed directions and spacers (16) to build a planar LC layer (26) with the desired pre-tilt angle α exhibited by LC director n. The cell spacers are usually dispersed across the volume of the cell gap or may be mixed with an adhesive and printed at the cell periphery. In view of the above examples, it can be appreciated that the deposition angle and the controlled close contact of the cylinder's surface with the alignment layer are critical parameters. That is why the precise alignment of LC on curved internal surfaces, providing appropriate pre-tilt angle and anchoring strength, is not an easy task and therefore the main effort of research and engineering community has been until now focused on flat TLCL solutions.

SUMMARY OF THE INVENTION

Accordingly, an object of the invention is to provide improved tunable-focusing liquid crystal lens cells and improved methods of fabrication thereof.

In a first aspect of the invention, there is proposed a tunable-focusing liquid crystal lens cell comprising first and second optically transparent substrates defining a cell gap therebetween, a liquid crystal layer arranged within the cell gap and an alignment layer provided on a third optically transparent substrate having a non-planar shape for giving a non-planar profile to the liquid crystal layer. The third substrate may be obtained from a flexible sheet initially provided with said alignment layer and then formed into the non-planar shape.

In an other aspect of the invention, there is proposed a method of manufacturing a tunable-focusing liquid crystal lens cell having a liquid crystal cell arranged within a cell gap defined between first and second optically transparent substrates, the second substrate being provided with a first optically transparent electrode, the method comprising the steps of: i) providing a third optically transparent substrate maintained in a substantially planar shape with a liquid crystal alignment layer; ii) providing one of said first substrate and said third substrate with a second optically transparent electrode; iii) providing a layer of optically transparent material having a refractive index and having a side facing toward an inner side of the first substrate; iv) joining the layer of optically transparent material and the third substrate, the liquid crystal alignment layer facing outwardly from the junction; v) forming the third optically transparent substrate provided with the alignment layer into a non-planar shape; vi) joining the liquid crystal alignment layer to a liquid crystal layer at one side thereof; and vii) joining the liquid crystal layer at the other side thereof to the second substrate; wherein the liquid crystal alignment layer gives to the liquid crystal layer a non-planar profile. The third optically transparent substrate of said step i) may be a flexible sheet.

BRIEF DESCRIPTION OF THE DRAWINGS

Preferred embodiments of the present invention will now be described in view of the following drawings, in which:

FIG. 2b schematically illustrates in cross-section a TLCL provided with a non-planar, concave LC cell gap, using a third optically transparent substrate according to a second embodiment of the present invention;

FIG. 2c schematically illustrates in cross-section a TLCL provided with a non-planar, concave LC cell gap, using a third optically transparent substrate according to a third embodiment of the present invention;

FIG. 3a schematically illustrates in cross-section a fabrication step for a first alignment layer provided on the third optically transparent substrate of FIG. 2a;

FIG. 3b schematically illustrates in cross-section the result of a fabrication step for the first substrate having its inner surface covered by the optional planar electrode, and for the hidden lens-shaped element of FIG. 2a;

FIG. 3c schematically illustrates in cross-section a fabrication step for a combined substrate having a non-planar shape;

FIG. 3d schematically illustrates in cross-section the combined substrate having a non-planar shape as obtained with the fabrication step of FIG. 3c;

FIG. 4 schematically illustrates in cross-section a modification of the proposed fabrication method wherein a combined substrate forming a planar cell gap is fabricated first, to be formed then into a non-planar profile;

FIG. 6 schematically illustrates in cross-section a TLCL combining two LC cell gaps similar than the cell gap shown in FIG. 5, but having directions of LC orientation in crossing relationship.

DETAILED DESCRIPTION OF THE PREFERRED EMBODIMENTS

Figure 2A:
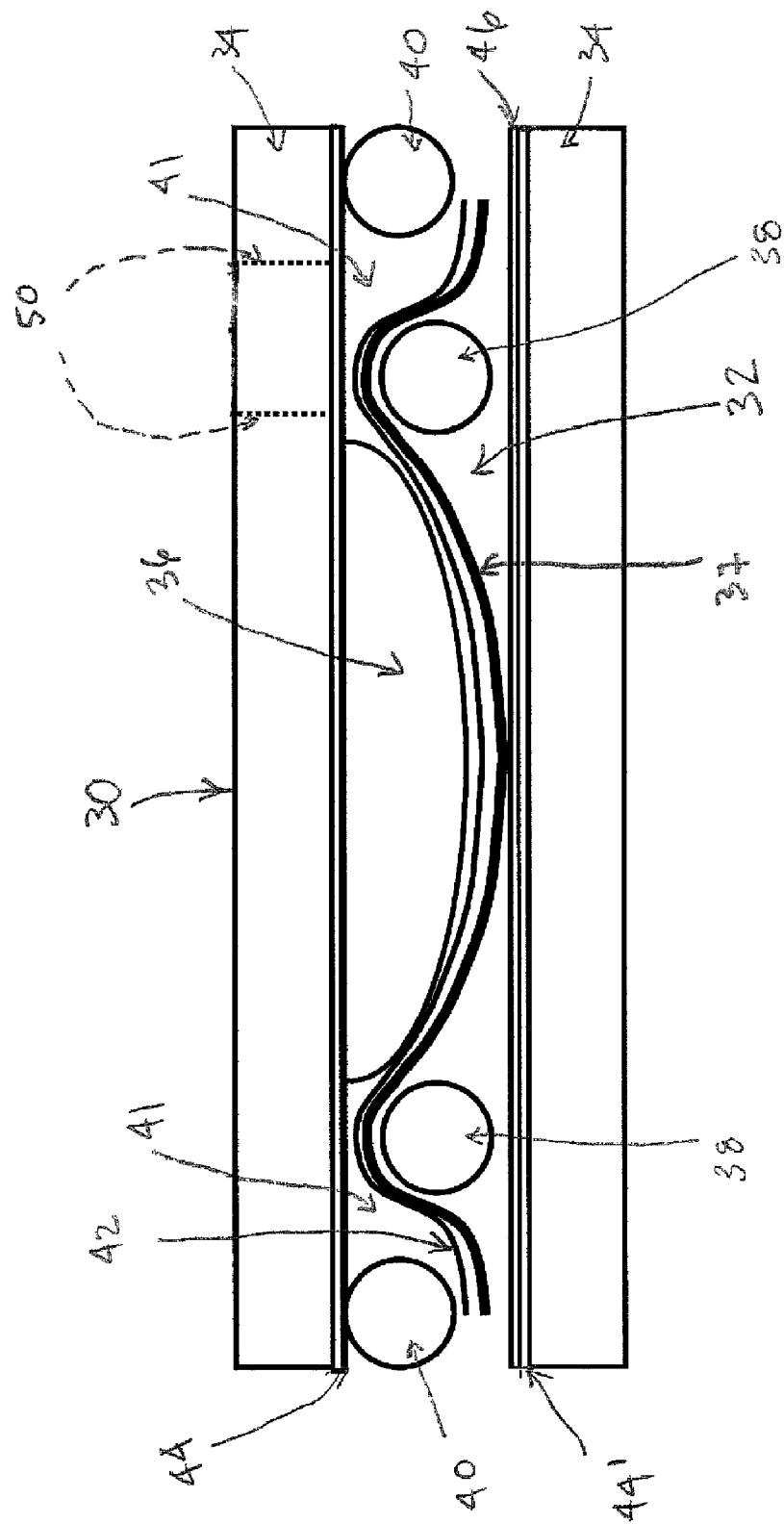
FIG. 2a schematically illustrates in cross-section a TLCL provided with a non-planar, concave LC cell gap, using a third optically transparent substrate according to a first embodiment of the present invention.

Referring now to FIG. 2a, a TLCL cell 30 according to a first embodiment of the present invention, includes first and second flat, rigid transparent (e.g. glass) substrates 34, 34' between which a liquid crystal cell gap 35 is defined. The lens cell 30 further includes a liquid crystal (LC) layer 32 arranged within the cell gap 35 along with other elements, namely a hidden lens-shaped element 36 made of proper, index-matched transparent material and having a substantially convex surface mating with LC layer 32, a layer of optically transparent material (e.g. adhesive) 41 of a substantially annular or square shape arranged between first substrate 34 and LC layer 32 and characterized by a refractive index substantially matching with the lens-shaped element index, and a first liquid crystal alignment layer 39 made of an appropriate material (e.g. SiO$_x$ or Polyimide) shown in FIG. 3d, arranged between layer 41 and LC layer 32. The first alignment layer 39 is provided on a third, thin optically transparent substrate 37 having a non-planar shape (convex in the example shown) for giving a non-planar profile (concave in the example shown) to LC layer 32 shown in FIG. 2a. Conveniently, the third substrate 37 is obtained from a flexible sheet initially provided with the alignment layer 39 and then formed into the non-planar shape, as will be described below in more detail. The TLCL cell 30 further includes a first, flat and optically transparent electrode 44 made of transparent conductive material (e.g. ITO) provided on the inner surface of second substrate 34', and a second, similar optically transparent electrode 44' provided on the inner surface of first substrate 34. The lens cell 30 may further include a second liquid crystal alignment layer 46 arranged between LC layer 32 and second substrate 34', by covering electrode 44 with an appropriate material (e.g. SiO$_x$ or Polyimide) facing LC layer 32. The electrodes 44 and 44' are arranged to generate an electric field acting on LC layer 32 to change the focal distance of lens cell 30. Optionally, an intermediate optically transparent electrode 42 may be provided on third substrate 37, thereby giving electrode 42 a non-planar shape. The LC layer 32 includes one or more rigid, inner-cell spacers 38 extending along its periphery. Similarly, the layer of optically transparent material 41 includes one or more rigid, outer-cell spacers 40 extending along its periphery.

As compared to the basic embodiment described above with reference to FIG. 2a, other TLCL cell embodiments including variants may be proposed for specific applications. In the second embodiment shown in FIG. 2b, the first substrate 34 provided on TLCL cell 30' is not covered with an electrode, and the intermediate electrode 42, which is not optional for this embodiment, contributes with electrode 44 provided on second substrate 34' to the creation of an electric field across the LC layer 32. A possible advantage of this non-planar electrode geometry is the partial compensation of the LC thickness variations by electric field variations. That is, in areas where the LC layer thickness is small, a stronger electric field due to closer sections of electrodes 42,44 may compensate for less refractive LC material within these areas, while in areas where the LC layer thickness is large, a weaker electric field due to farther sections of electrodes 42, 44, may compensate for more refractive material within such areas.

It will be appreciated that the shape curvature of the third substrate 37 is typically much less significant than the pre-tilt angle of the LC alignment layer, such that the effective pre-tilt is not significantly disturbed by the deformation of the third substrate. Furthermore, when the intermediate electrode 42 is provided, the electric field is directed more in the direction of the normal to the third substrate 37, thus reducing the effect of deformation angle on the effective pre-tilt.

It will be also appreciated that when the top electrode is on the substrate 34 instead of the surface of third substrate 37 (i.e. 42), element 36 can have no effect on the electric field, or it can shape the electric field if its dielectric properties are so selected. One possibility is to select a material that has a frequency-dependent permittivity. In this case, the element 36 can be, for example conductive at low control signal frequencies fed to the electrodes of the TLCL cell, and an insulator at high control signal frequencies. This allows for a dynamic shaping of the effective electrode that can be advantageous. In this case, by changing the frequency of the drive one can also change the tilt of the electric field that the LC molecules see.

In the third embodiment shown in FIG. 2c wherein no intermediate electrode is used, the first substrate 34 provided on TLCL cell 30" is covered with electrode 44', which contributes with electrode 44 provided on second substrate 34' to the creation of the electric field across the LC layer 32. Possible advantages of this planar electrode geometry are the simplicity of fabrication and the higher integrity of electrode 44' as compared with the use of an intermediate electrode.

Figure 3A:
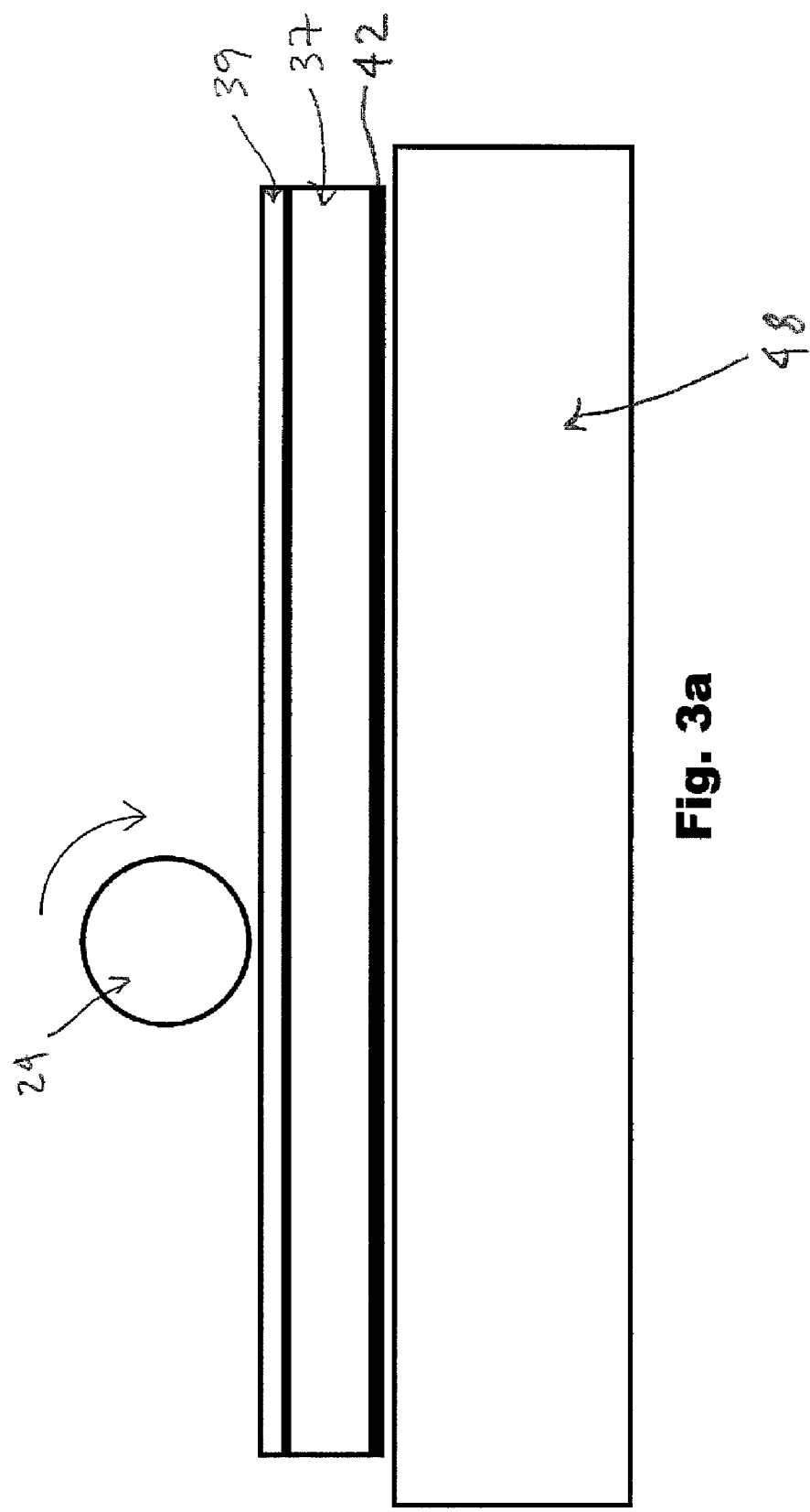

Proposed methods for fabricating TLCL cells as described above will now be explained in detail with reference to FIGS. 3a to 3d. These methods use the benefit of flat-substrate fabrication techniques, while allowing the creation of non-planar LC cell gap devices for TLCL applications. In accordance with a first proposed method, a first step that aims at producing the third substrate 37 provided with the first alignment layer 39 is illustrated in FIG. 3a, which step is based on the use of an initially flat sheet made of transparent flexible material. This step is similar to the prior art manufacturing procedure that involves rubbing with cylinder-type device 24 or coating as described above, but using in this case a flat and rigid manufacturing support 48 to ensure that the flexible sheet forming the substrate 37 is maintained in a substantially planar shape while the first alignment layer 39 is being rubbed. If desired, the intermediate electrode 42 made of transparent conductive material may be coated on the other flat surface of the flexible substrate 37. Otherwise, as mentioned below, second electrode 44' may be provided on first substrate 34. The produced third substrate 37 may be then removed from the support 48 for later use.

Figure 3B:
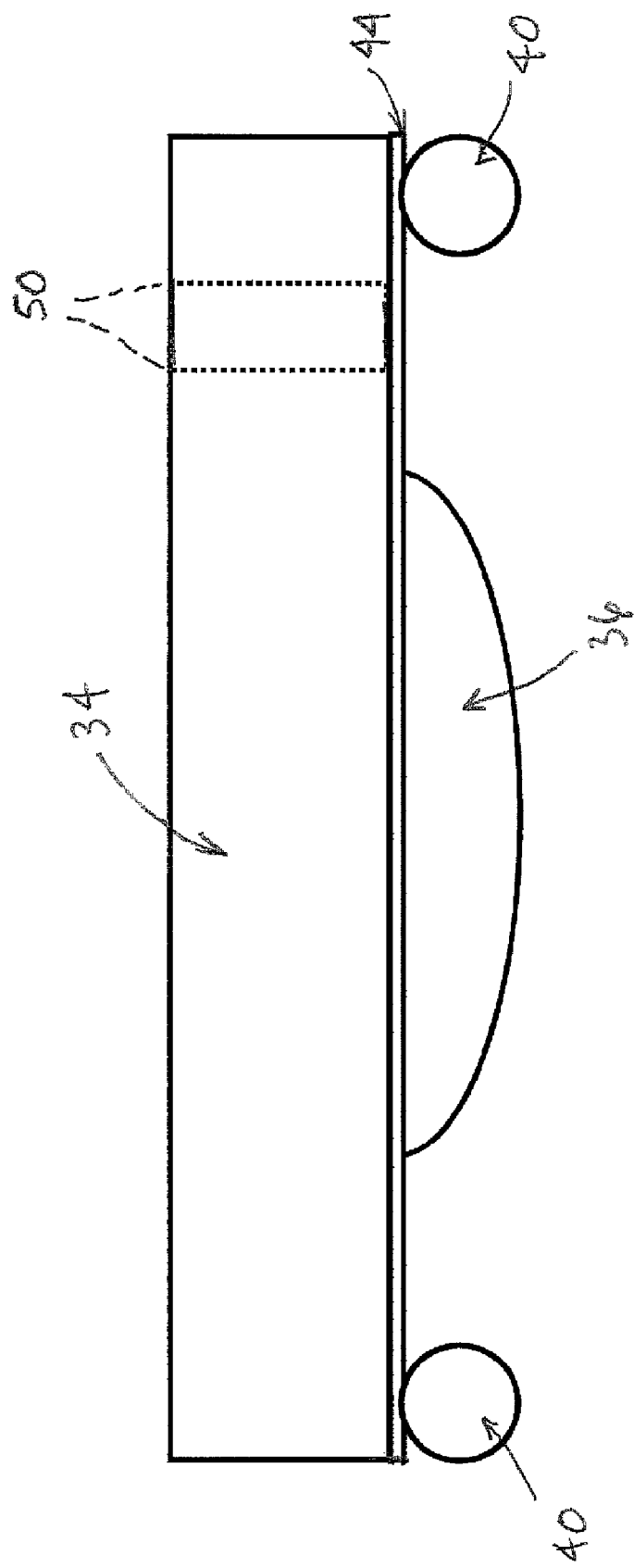

Referring now to FIG. 3b, a next step of the proposed method aims at fabricating the first substrate 34 having its inner surface covered by planar electrode 44' as well as the hidden lens-shaped element 36. This step can be performed from a rigid substrate used as a support of arrays of desired lens-shaped elements, fabricated by any appropriate procedure such as molding or replication. That same step may alternatively be performed by joining a separate element 36 to the inner surface of substrate 34 or optional electrode 44' through an appropriate securing means such as a transparent adhesive. The outer-cell rigid spacers 40, which may be of any appropriate form such as an annular or square like structure, are also provided at periphery of the inner surface of substrate 34 or intermediate electrode 44' through any appropriate procedure such as printing or replication, or alternatively affixed thereto with an appropriate adhesive. Optionally, one or more holes 50 may be drilled through substrate 34, preferably away from the optically active areas, the purpose of these optional holes being explained below.

A next step aims at fabricating a combined substrate 52 whose inner surface is formed by the alignment layer 39 showing a non-planar profile following the lens-like profile of element 36 as shown in FIG. 3d. In this step, in view of FIG. 3c, the flexible substrate 37 with alignment layer 39 (with or without optional intermediate electrode 42) obtained as described above in view of FIG. 3a and the first substrate 34 with lens-shaped element 36 and spacers 40 (with or without optional electrode 44') obtained as described above in view of FIG. 3b are joined together in a relative direction indicated by arrow 54 in FIG. 3c in a way to have the alignment layer 39 facing outwardly with respect to the junction area 55 in FIG. 3d. This step may be realized, for example, by injecting an index matched optically transparent material to initially fill the volume 57 delimited by substrate 34 (or optional electrode 44'), lens-like element 36 and spacers 40, which material will form the layer 41 having a side facing toward an inner side of first substrate 34 as shown in FIG. 2a. Then, the layer 41 and third substrate 37 are joined together, with the liquid crystal alignment layer 39 facing outwardly from the junction, and third substrate 37 provided with alignment layer 39 are formed into a non-planar shape, by pressing substrates 34 and 37 towards each other using an additional rigid manufacturing support 59 having appropriately formed strong structures 61 to apply the required distribution of deforming stress on the third substrate 37 and alignment layer 39. A same result could also be obtained with a structure of an inversed (concave) lens-like form disposed on the rigid manufacturing support, or by using vacuum through holes 50 to evacuate residual air within volume 57 while producing the desired non-planar profile junction, for finally filling holes 50 with an appropriate sealing material.

Another alternative approach to fabricate the combined substrate 52 would use shrinkage properties of either or both (differential shrinkage) index matched optically transparent materials respectively constituting element 36 and being injected within volume 57 as shown in FIG. 3c. For example, a low-shrinkage optical adhesive could be used to form element 36 while a high-shrinkage optical adhesive could be injected within volume 57. In practice, the required non-flatness of the LC layer 32 being very small for typical TLCL applications (e.g. only 15 μm of modulation depth on 1000 μm radius could provide acceptable optical power variability of the order of 9 diopters) the third substrate 37 and LC alignment layer 39 could be sufficiently bent using such shrinkage effect.

Figure 1A:
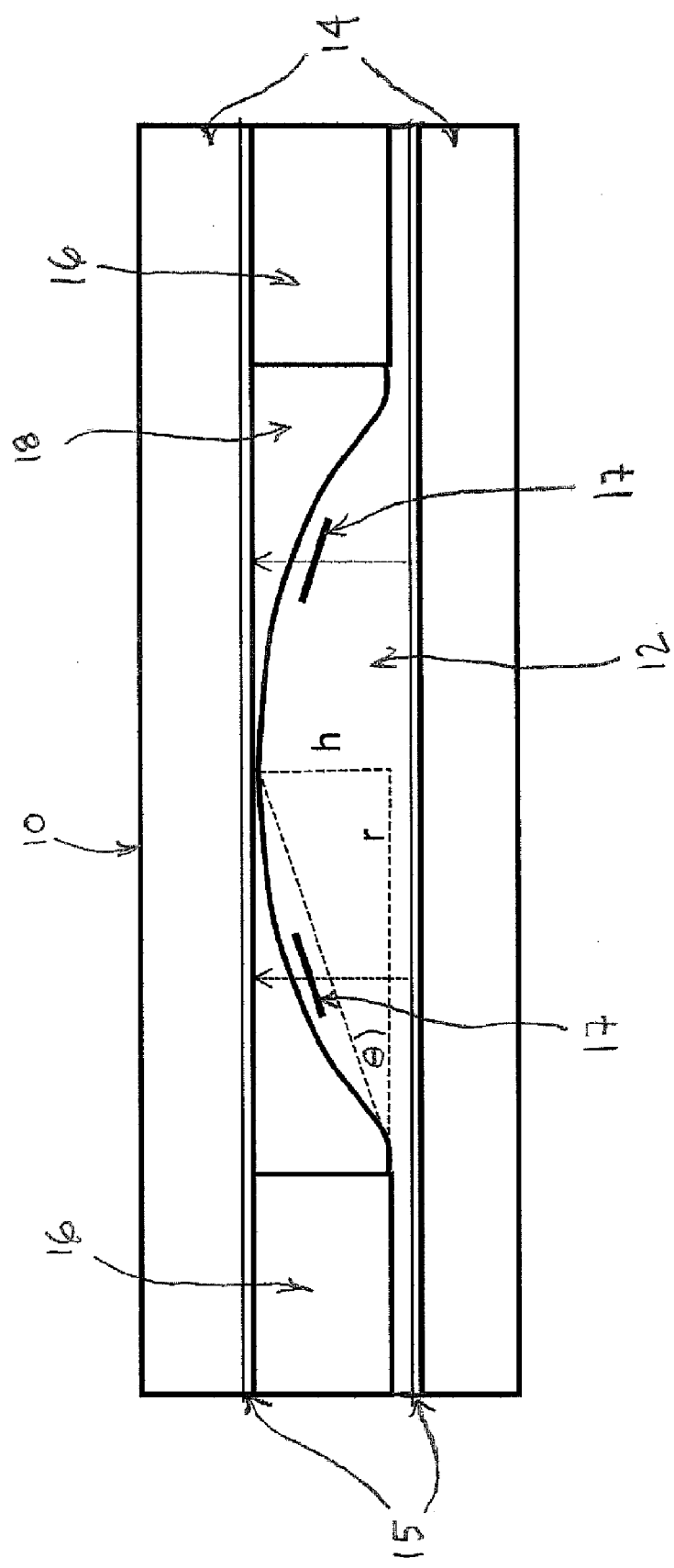
FIG. 1 schematically illustrates in cross-section principal elements of a prior art TLCL with non-planar LC cell gap sandwiched between two optically transparent substrates.
FIG. 1b schematically illustrates in cross-section a mechanical rubbing step as part of a prior art TLCL manufacturing method.
FIG. 1c schematically illustrates in cross-section a TLCL assembly step as part of the prior art manufacturing method.
Figure 1B:
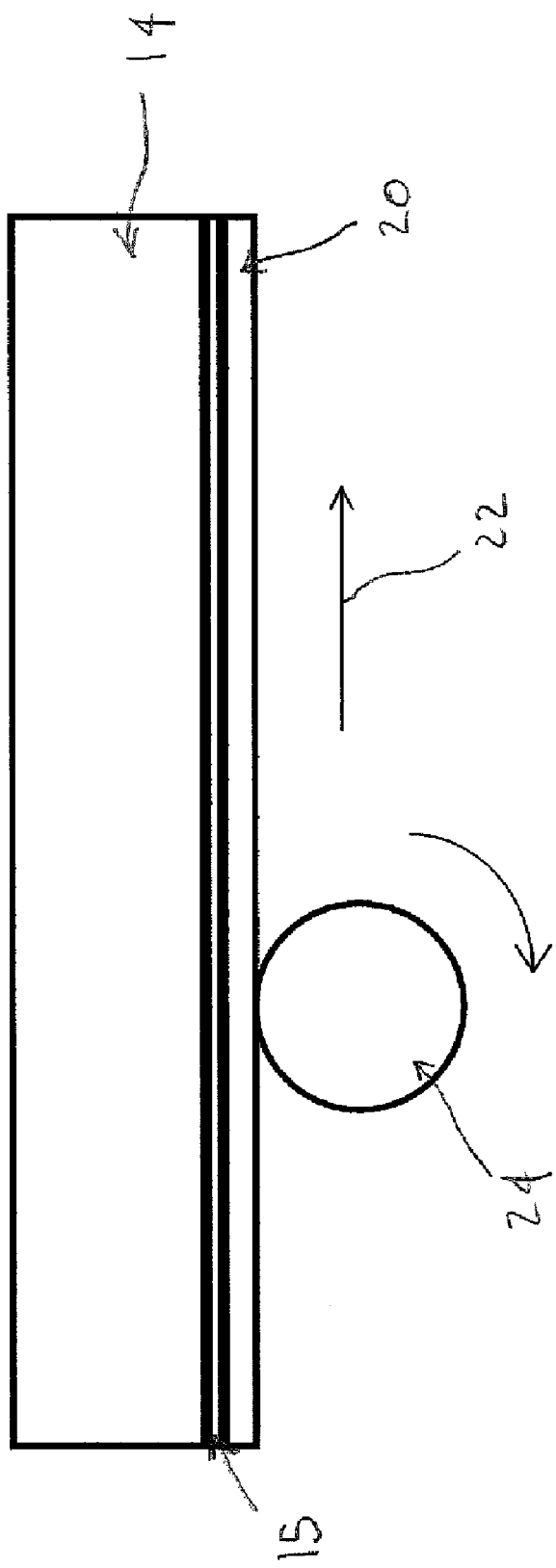
Figure 1C:
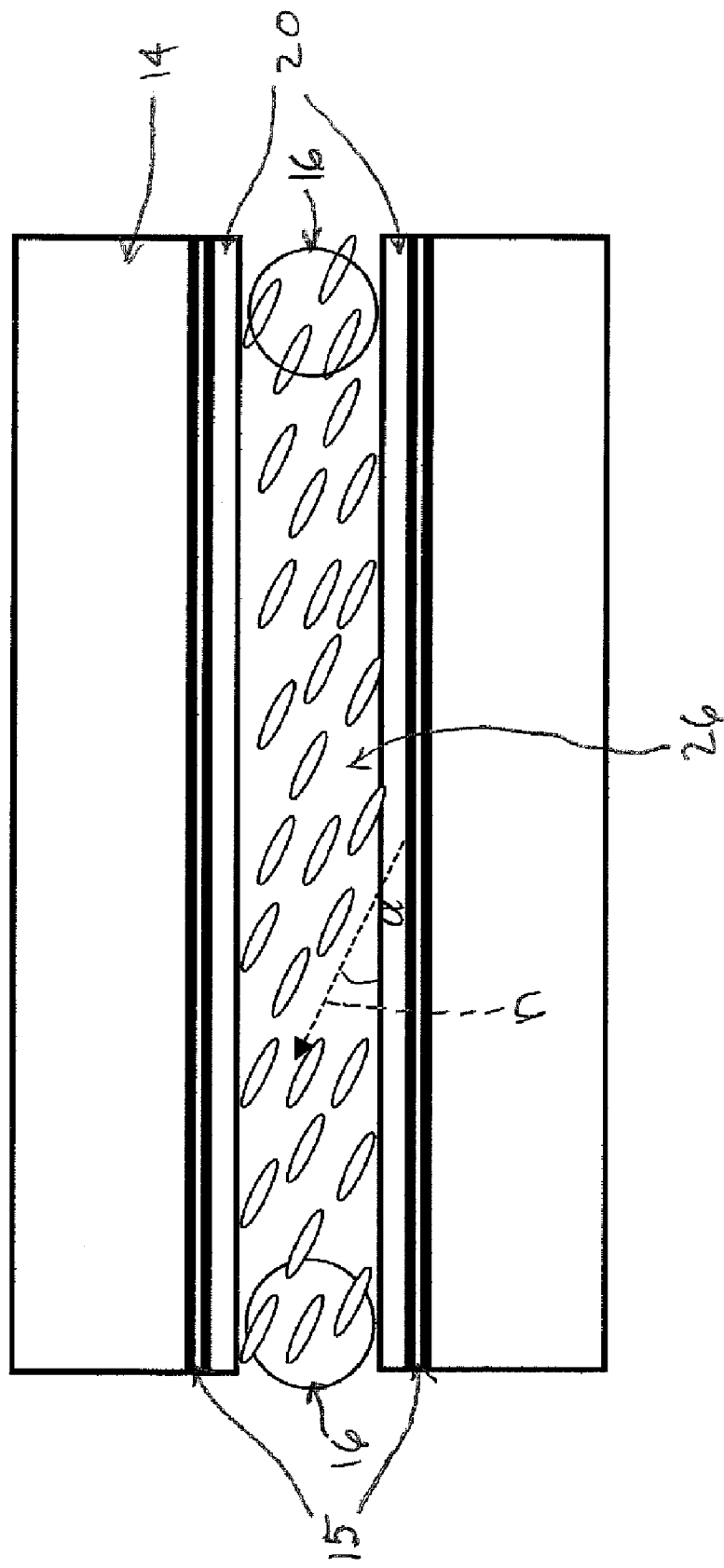

Then, turning back to FIG. 2a, the liquid crystal alignment layer 39 is joined to LC layer 32, which is in turn joined to the second substrate 34' covered with planar electrode 44 and second alignment layer 46, the latter giving to LC layer 32 a non-planar profile mating with the non-planar shape. The substrate 34' covered with planar electrode 44 may have been previously fabricated using the same known method as discussed above in view of FIG. 1b (PRIOR ART). As a result, a TLCL cell 30, 30' or 30" provided with a non-planar LC layer 32, as described above respectively in view of FIGS. 2a, 2b or 2c is obtained.

Different modifications of the proposed methods may be considered. For example, referring to FIG. 4, a combined substrate generally designated at 63 forming a planar LC layer 65 may be fabricated first using second substrate 34' covered with planar electrode 44 and second LC alignment layer 46, and the third substrate 37 covered with first LC alignment layer 39 (with or without intermediate electrode 42) in its initial flat state, between which the LC layer 65 is sandwiched using spacers 38. Then, the first substrate 34 having its inner surface covered or not by the planar electrode 44', the hidden lens-shaped element 36 and the spacers 40 are assembled, using a transparent material that will form layer 41 as explained above in view of FIG. 2a, with the combined substrate 63 as indicated by arrow 67, and a non-planar profile LC layer 32 such as described above can finally be obtained using one of the forming methods described above in view of FIG. 3c. Another possible modification could consist of forming the desired non-planar shape of the third substrate provided with LC alignment layer, fixing it (e.g. with optical adhesive), assembling it with the second substrate between which the LC layer is sandwiched using spacers, and then reinforcing the whole structure by adding a rigid first substrate.

Figure 5:
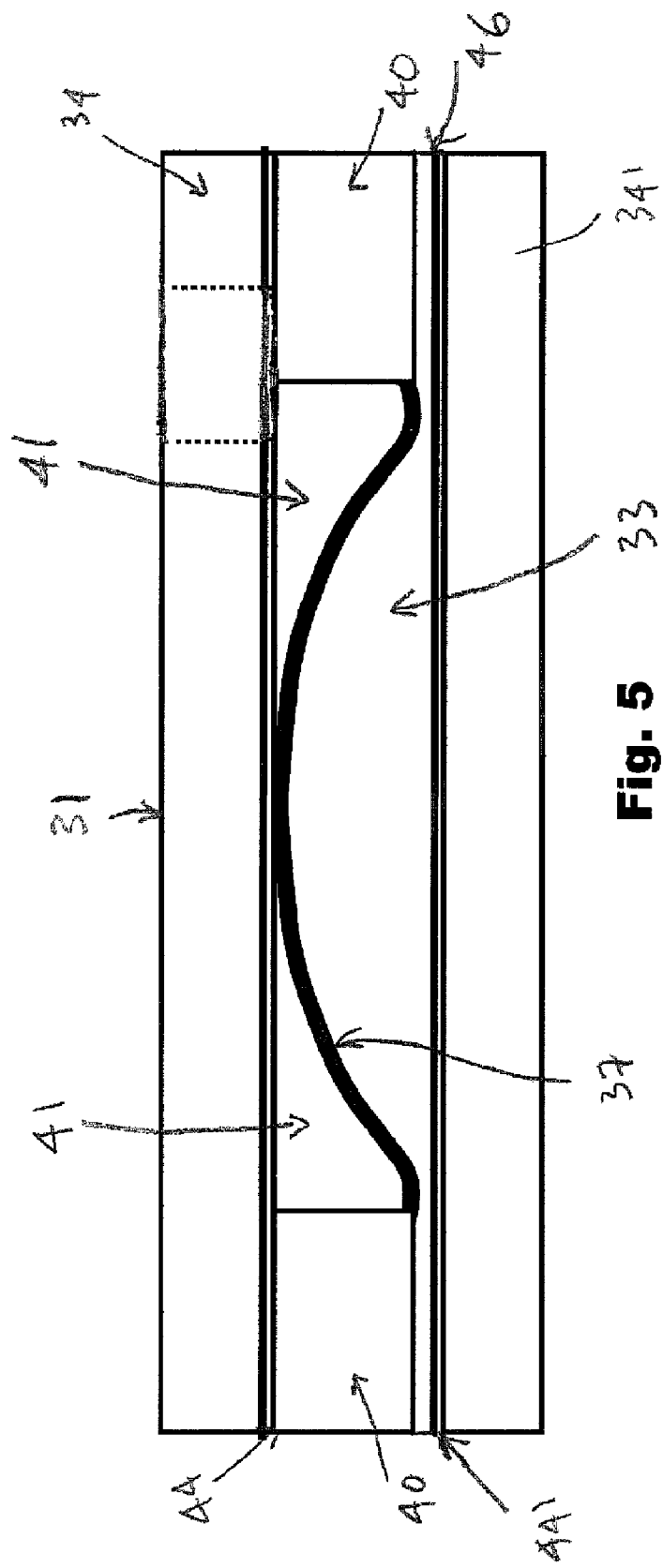
FIG. 5 schematically illustrates in cross-section a TLCL using a non-planar cell gap of the opposed, convex sign of curvature.

For those skilled in the art, it is easy to imagine the use of the same or similar methods of fabrication as described above to build a non-planar LC layer 33 of the opposed, convex sign of curvature in a TLCL cell 31 as shown in FIG. 5, when compared to the geometries described above with reference to FIGS. 2a to 2c (i.e. having thicker central LC zone as opposed to the thinner central LC zone found in the previous geometries), with the use of appropriately shaped third substrate 37 and optically transparent layer 41. It can be appreciated that for the purpose of forming such convex profile, the non-planar shape exhibited by third substrate is substantially concave, and the transparent material layer 41 has a substantially concave surface mating with LC layer 33.

For a given alignment condition, for example planar (or homogeneous), this convex LC layer profile would allow the control of the TLCL cell's optical power from high positive to low positive or even negative values depending upon the relative refractive indexes of the optically transparent layer 41 ($n_m$) and ordinary ($n_o$) as well as extra-ordinary ($n_e$) refractive indexes of the LC used. Thus, as a non-limitative example, in the case of a planar alignment and with $n_e > n_o = n_m$, we can have positive optical power at U=0 volt and null (0) optical power at high voltages. In contrast, the same conditions applied to the previous geometries shown in FIGS. 2a to 2c would provide negative optical power at U=0 volt and null (0) optical power at high voltages.

According to another embodiment shown in FIG. 6, two LC layers 33', 33" profiled by respective substrates 37, 37' and similar than the LC layer 33 described above in view of FIG. 5 but having directions of LC orientation in crossing relationship can be combined to obtain a TLCL cell 31' with no polarization dependence. In this embodiment, first substrate 34 is at a top portion of TLCL cell 31', the first alignment layer 39 being characterized by a first direction of orientation for LC layer 33'. In addition to the components provided on the TLCL cell 31 described above in view of FIG. 5, the TLCL cell 31' further includes a fourth optically transparent substrate 74 at a bottom portion thereof, and a fifth optically transparent substrate 76 adjacent second substrate 34'. The TLCL cell 31 further includes a further LC layer 33" arranged within a second cell gap defined between fourth and fifth substrates 74, 76, a further layer 41' of optically transparent material having a refractive index and arranged between fourth substrate 74 and further LC layer 33". The layer 41' includes one or more further outer-cell spacers 40' extending along its periphery. There is a further liquid crystal alignment layer 39' arranged between optically transparent material layer 41' and further LC layer 33". The further alignment layer 39' is provided on a sixth optically transparent substrate 37' shaped with a substantially concave shape for giving a mating substantially convex profile to further LC layer 33'. Moreover, the further alignment layer 39' is characterized by a second direction of orientation for further LC cell gap 33', as mentioned above. The TLCL cell 31' further includes a third optically transparent electrode 80 provided on fifth substrate 76, and a fourth optically transparent electrode 82 either provided on fourth substrate 74 as shown, or on sixth substrate 37'. It can be appreciated that first and second electrodes 44, 44' and third and fourth electrodes 80, 82 are arranged to generate an electric field acting on a respective one of LC layer 33', 33" to change the focal distance thereof with substantially no polarization dependence. Optionally, a central LC alignment layer 84 with fifth optically transparent electrode can be arranged at a junction of second and fifth substrates 34' and 76, to generate an electric field acting on both LC layers 33', 33".

According to a variant of such embodiment, the second and fifth substrates 34' and 76 can be provided as a common substrate, while omitting the associated central alignment layer 84 and electrode 86.

What is claimed is:

1. A tunable-focusing liquid crystal lens cell comprising:
   first and second optically transparent substrates defining a cell gap therebetween;
   a liquid crystal layer arranged within said cell gap; and
   an alignment layer provided on a third optically transparent substrate having a non-planar shape for giving a non-planar profile to said liquid crystal layer.

2. The lens cell as defined in claim 1, wherein said third substrate is obtained from a flexible sheet initially provided with said alignment layer and then formed into said non-planar shape.

3. The lens cell as defined in claim 2, further comprising:
   a first optically transparent electrode provided on said second substrate; and
   a second optically transparent electrode provided on one of said first substrate and said third substrate;
   wherein said electrodes are arranged to generate an electric field acting on said liquid crystal layer to change the focal distance of said lens cell.

4. The lens cell as defined in claim 3, further comprising:
   a layer of optically transparent material having a refractive index and arranged between said first substrate and said liquid crystal layer.

5. The lens cell as defined in claim 4, further comprising a further liquid crystal alignment layer arranged between said liquid crystal layer and said second substrate.

6. The lens cell as defined in claim 5, wherein said liquid crystal layer includes one or more inner-cell spacers extending along its periphery.

7. The lens cell as defined in claim 6, wherein said layer of optically transparent material includes one or more outer-cell spacers extending along its periphery.

8. The lens cell as defined in claim 7, wherein said layer of optically transparent material is of a substantially annular or squared shape, said non-planar shape being substantially convex, said non-planar profile being substantially concave, said layer of optically transparent material further includes a lens-shaped element made of an optically transparent material and having a substantially convex surface mating with said liquid crystal layer.

9. The lens cell as defined in claim 8, wherein the optically transparent material of said lens-shaped element has a refractive index substantially matching the refractive index of said layer of optically transparent material.

10. The lens cell as defined in claim 8, wherein said second optically transparent electrode is provided on said first substrate, the optically transparent material of said lens-shaped element having a frequency-dependent permittivity to allow dynamic shaping of said electric field.

11. The lens cell as defined in claim 5, wherein said layer of optically transparent material includes one or more outer-cell spacers extending along its periphery.

12. The lens cell as defined in claim 11, wherein said non-planar shape is substantially concave, said non-planar profile being substantially convex, said layer of optically transparent material having a substantially concave surface mating with said liquid crystal layer.

13. The lens cell as defined in claim 12, wherein said first substrate is at a top portion of said lens cell, said alignment layer being characterized by a first direction of orientation for said liquid crystal layer, said lens cell further comprising:
   a fourth optically transparent substrate at a bottom portion of said lens cell;
   a fifth optically transparent substrate adjacent said second substrate, said fourth and fifth substrates defining a further cell gap therebetween;
   a further liquid crystal layer arranged within said further cell gap;
   a further alignment layer provided on a sixth optically transparent substrate shaped with a substantially concave shape for giving a substantially convex profile to said further liquid crystal layer, said further alignment layer being characterized by a second direction of orientation for said further liquid crystal layer;
   a further layer of optically transparent material having a refractive index and arranged between said fourth substrate and said further liquid crystal layer, and including one or more further outer-cell spacers extending along its periphery;
   a third optically transparent electrode provided on said fifth substrate;

a fourth optically transparent electrode provided on one of said fourth substrate and said sixth substrate; and wherein said first and second direction of orientation are in crossing relationship, said first and second electrodes and said third and fourth electrodes being arranged to generate an electric field acting on a respective one of said liquid crystal layers to change the focal distance of said cell with substantially no polarization dependence.

14. The lens cell as defined in claim 13, further comprising a central liquid crystal alignment layer and a fifth optically transparent electrode arranged at a junction of said second and fifth substrate, to generate an electric field acting on both said liquid crystal layers.

15. The lens cell as defined in claim 13, wherein said second and fifth substrates are provided as a common substrate.

16. A method of manufacturing a tunable-focusing liquid crystal lens cell having a liquid crystal cell arranged within a cell gap defined between first and second optically transparent substrates, said second substrate being provided with a first optically transparent electrode, said method comprising the steps of:
   i) providing a third optically transparent substrate maintained in a substantially planar shape with a liquid crystal alignment layer;
   ii) providing one of said first substrate and said third substrate with a second optically transparent electrode;
   iii) providing a layer of optically transparent material having a refractive index and having a side facing toward an inner side of said first substrate;
   iv) joining said layer of optically transparent material and said third substrate, the liquid crystal alignment layer facing outwardly from the junction;
   v) forming said third optically transparent substrate provided with the alignment layer into a non-planar shape;
   vi) joining said liquid crystal alignment layer to a liquid crystal layer at one side thereof; and
   vii) joining said liquid crystal layer at the other side thereof to said second substrate;
   wherein said liquid crystal alignment layer gives to said liquid crystal layer a non-planar profile.

17. The method as defined in claim 16, wherein said third optically transparent substrate of said step i) is a flexible sheet.

18. The method as defined in claim 17, wherein all said steps i) to vii) are performed in the order.

19. The method as defined in claim 17, wherein said steps iv) and v) are performed after said step vii).

20. The method as defined in claim 17, wherein said step iv) is performed after said step vii).

21. The method as defined in claim 17, wherein said liquid crystal layer is joined to said second substrate at said step vii) with a further liquid crystal alignment layer arranged therebetween.

22. The method as defined in claim 21, wherein said third optically transparent substrate provided with the alignment layer is formed at said step v) using one or more inner-cell spacers extending along the periphery of said liquid crystal layer.

23. The method as defined in claim 22, wherein said third optically transparent substrate provided with the alignment layer is further formed at said step v) using one or more outer-cell spacers extending along the periphery of said layer of optically transparent material.

24. The method as defined in claim 23, wherein said layer of optically transparent material is of a substantially annular or square shape, said non-planar shape being substantially convex, said non-planar profile being substantially concave, said method further comprising a step of providing between said first substrate and said layer of optically transparent material a lens-shaped element made of an optically transparent material and having a substantially convex surface mating with said liquid crystal layer.

25. The method as defined in claim 21, wherein said third optically transparent substrate provided with the alignment layer is formed at said step v) using one or more outer-cell spacers extending along the periphery of said layer of optically transparent material.

26. The method as defined in claim 25, wherein said layer of optically transparent material is of a substantially annular shape, said non-planar shape being substantially concave, said non-planar profile being substantially convex.

27. The method as defined in claim 26, wherein said tunable-focusing liquid crystal lens cell has a further liquid crystal layer arranged within a second cell gap defined between a fourth optically transparent substrate at a bottom portion of said lens cell and a fifth optically transparent substrate adjacent said second substrate, said fifth substrate being provided with a third optically transparent electrode, said first substrate being at a top portion of said lens cell, said alignment layer being characterized by a first direction of orientation for said first liquid crystal layer, said method further comprising the step of:
   viii) providing a sixth optically transparent substrate maintained in a substantially planar shape with a further liquid crystal alignment layer;
   ix) providing one of said fourth substrate and said sixth substrate with a fourth optically transparent electrode;
   x) providing a further layer of optically transparent material having a refractive index and having a side facing toward an inner side of said fourth substrate;
   xi) joining said further layer of optically transparent material and said sixth substrate, the further liquid crystal alignment layer facing outwardly from the junction;
   xii) forming said sixth optically transparent substrate provided with the further alignment layer into a substantially concave shape;
   xiii) joining said liquid crystal alignment layer to a further liquid crystal layer at one side thereof; and
   xiv) joining said further liquid crystal layer at the other side thereof to said fifth substrate;
   wherein said further liquid crystal alignment layer gives to said further liquid crystal layer a substantially convex profile mating with said concave shape, said further liquid crystal alignment layer being characterized by a second direction of orientation for said further liquid crystal layer, said first and second direction of orientation being in crossing relationship.

28. The method as defined in claim 27, further comprising the step of arranging a central liquid crystal alignment layer and a fifth optically transparent electrode at a junction of said second and fifth substrate.

29. The method as defined in claim 27, wherein said second and fifth substrates are provided as a common substrate.

30. The method as defined in claim 27, wherein all said steps viii) to xv) are performed in the order.

31. The method as defined in claim 27, wherein said steps xi) and xii) are performed after said step xiv).

32. The method as defined in claim 27, wherein said step xi) is performed after said step xiv).

* * * * *